US012352412B1

(12) United States Patent
Rothbauer et al.

(10) Patent No.: US 12,352,412 B1
(45) **Date of Patent: *Jul. 8, 2025**

(54) LED LIGHT HOLDING SYSTEM

(71) Applicant: Sigma Switches Plus, Inc., Elkhart, IN (US)

(72) Inventors: Brian Rothbauer, Elkhart, IN (US); Adrian Byers, Elkhart, IN (US); Nick Rothbauer, Elkhart, IN (US)

(73) Assignee: Sigma Switches Plus, Inc., Elkhart, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 19/081,606

(22) Filed: Mar. 17, 2025

Related U.S. Application Data

(63) Continuation-in-part of application No. 18/794,130, filed on Aug. 5, 2024, now Pat. No. 12,276,396.

(60) Provisional application No. 63/614,739, filed on Dec. 26, 2023.

(51) Int. Cl.

| | |
|---|---|
| ***F21V 19/00*** | (2006.01) |
| ***F21S 4/20*** | (2016.01) |
| ***F21S 8/04*** | (2006.01) |
| ***F21V 15/015*** | (2006.01) |
| ***F21Y 115/10*** | (2016.01) |

(52) U.S. Cl.
CPC .............. *F21V 19/004* (2013.01); *F21S 4/20* (2016.01); *F21S 8/043* (2013.01); *F21V 15/015* (2013.01); *F21Y 2115/10* (2016.08)

(58) Field of Classification Search
CPC .... F21V 19/004; F21V 15/015; F21V 23/002; F21S 4/20; F21S 8/043; F21Y 2115/10
See application file for complete search history.

(56) References Cited

U.S. PATENT DOCUMENTS 12,276,396 B1 * 4/2025 Rothbauer ............ F21V 19/004

* cited by examiner

*Primary Examiner* — James R Greece
*Assistant Examiner* — Jose M Diaz
(74) *Attorney, Agent, or Firm* — Botkin & Hall, LLP; Michael D. Marston

(57) ABSTRACT

A light holding system having a light holder with wings that define an outer contoured surface. A channel extends inwardly of the outer contoured surface and has a bottom wall and lateral walls. The wings are resiliently bendable between an uninstalled and an installed position. In the uninstalled position the tips of the wings are at a first distance from an opening in the channel and in the installed position the tips of the wings are at a second distance from the opening in the channel. The second distance less than the first distance.

18 Claims, 14 Drawing Sheets

LED LIGHT HOLDING SYSTEM

CROSS REFERENCE TO RELATED APPLICATIONS

This Application is a Continuation-in-Part of U.S. application Ser. No. 18/794,130 filed on Aug. 5, 2024, which claims the priority of U.S. Provisional Application Ser. No. 63/614,739, filed Dec. 26, 2023, and is hereby incorporated in its entirety by reference

BACKGROUND OF THE INVENTION

Recreational vehicles ("RV") are designed to be increasingly luxurious as customers demand the fit and finish of such RVs to be commensurate with their expectations. Lighting is an important factor in the overall appearance of an RV interior. Traditionally, can lights (sometimes referred to as puck lights) were cut into ceilings of RVs and then the holes for recessed can lights were covered with decorative bezels to obscure the hole made by a hole saw.

The traditional lights described above required electrical connections be made above the ceiling. This is cumbersome and makes installation more difficult. Additionally, having electrical connections above the ceiling makes repair of any such light difficult.

Light emitting diode ("LED") light strips are proving to be useful in RVs. There are a number of reasons for this. A couple of significant reasons for this are that RVs often have 12V DC electrical wiring and LEDs consume relatively little energy when compared to incandescent light bulbs. Additionally, LED prices have fallen as they have become more popular and available in many different colors. There is a need for mounting LED lights to the ceiling of RVs in a manner that is inexpensive and aesthetically pleasing. More generally, it is useful to mount LED lights to other areas in RVs or other applications where LED lights come in strips in a decorative way that enhances the appearance of LED light strips.

SUMMARY OF THE INVENTION

A light holding system that is used to hold an LED light strip adjacent to a surface to which it will be fastened. The light holding system may have a retaining strip that is used with an elongate light holder. The elongate light holder has wings that define an outer contoured surface. The wings have tips. A channel extends beneath the outer contoured surface and has lateral walls that define an internal width of the channel. The lateral walls are joined to a bottom wall. One of the retaining strip and the elongate light holder has a ridge wall including a retention barb and the other of the elongate light holder and the retaining strip has a groove including upstanding walls defining the groove. A portion of the retention barb is wider than the ridge wall. The wings are resiliently bendable between an uninstalled position and an installed position. The uninstalled position locates the tips of the wings at a first distance from the opening and the installed position locates the tips of the wings at a second distance from the opening. The second distance is smaller than the first.

DETAILED DESCRIPTION OF INVENTION

Figure 1:
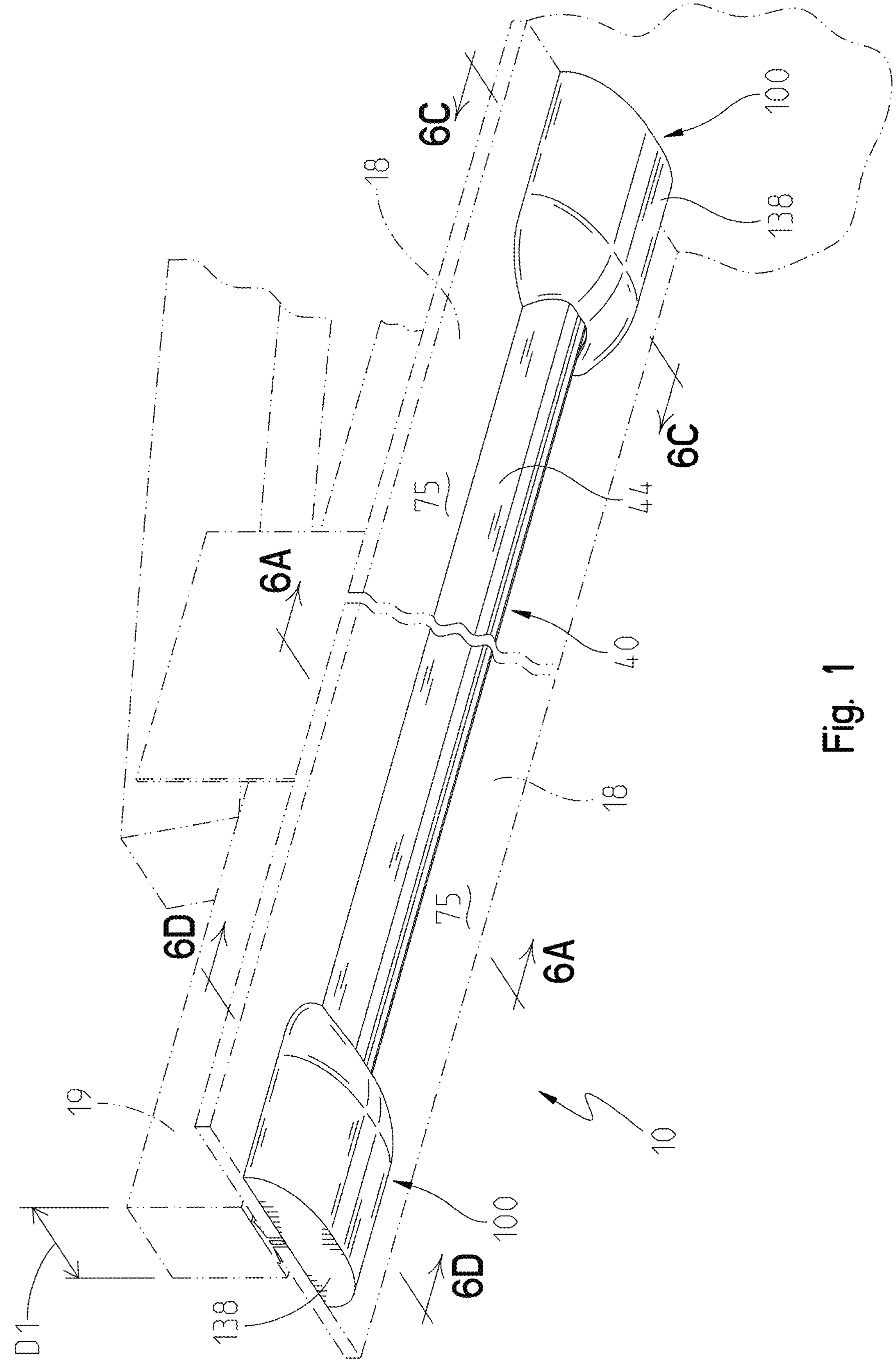
FIG. 1 is a perspective view of the LED light strip holding system of the present invention.
Figure 2:
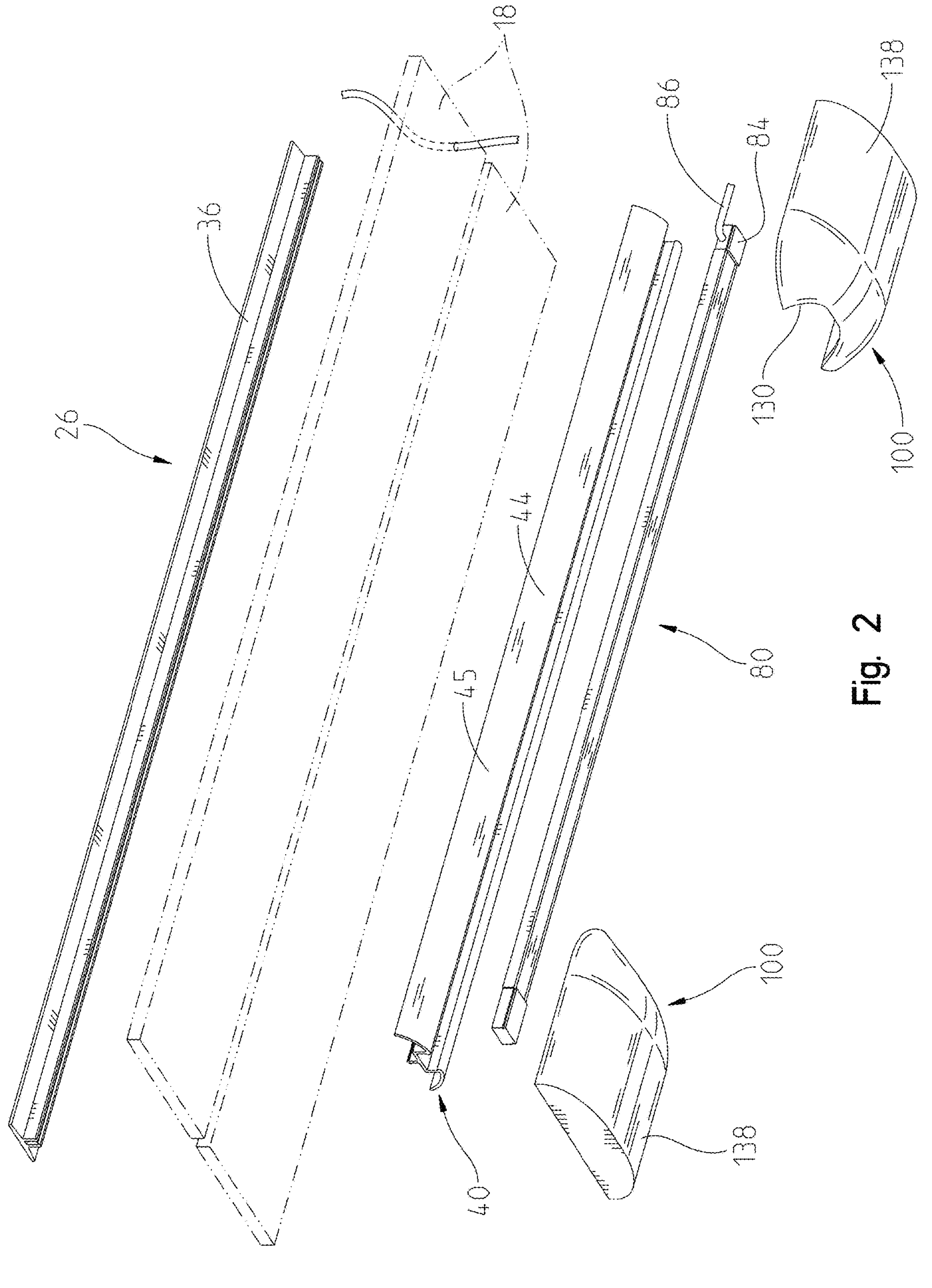
FIG. 2 is an exploded perspective view of the LED light strip holding system shown in FIG. 1 showing the ceiling adjacent to the LED light strip holding system from below.
Figure 3:
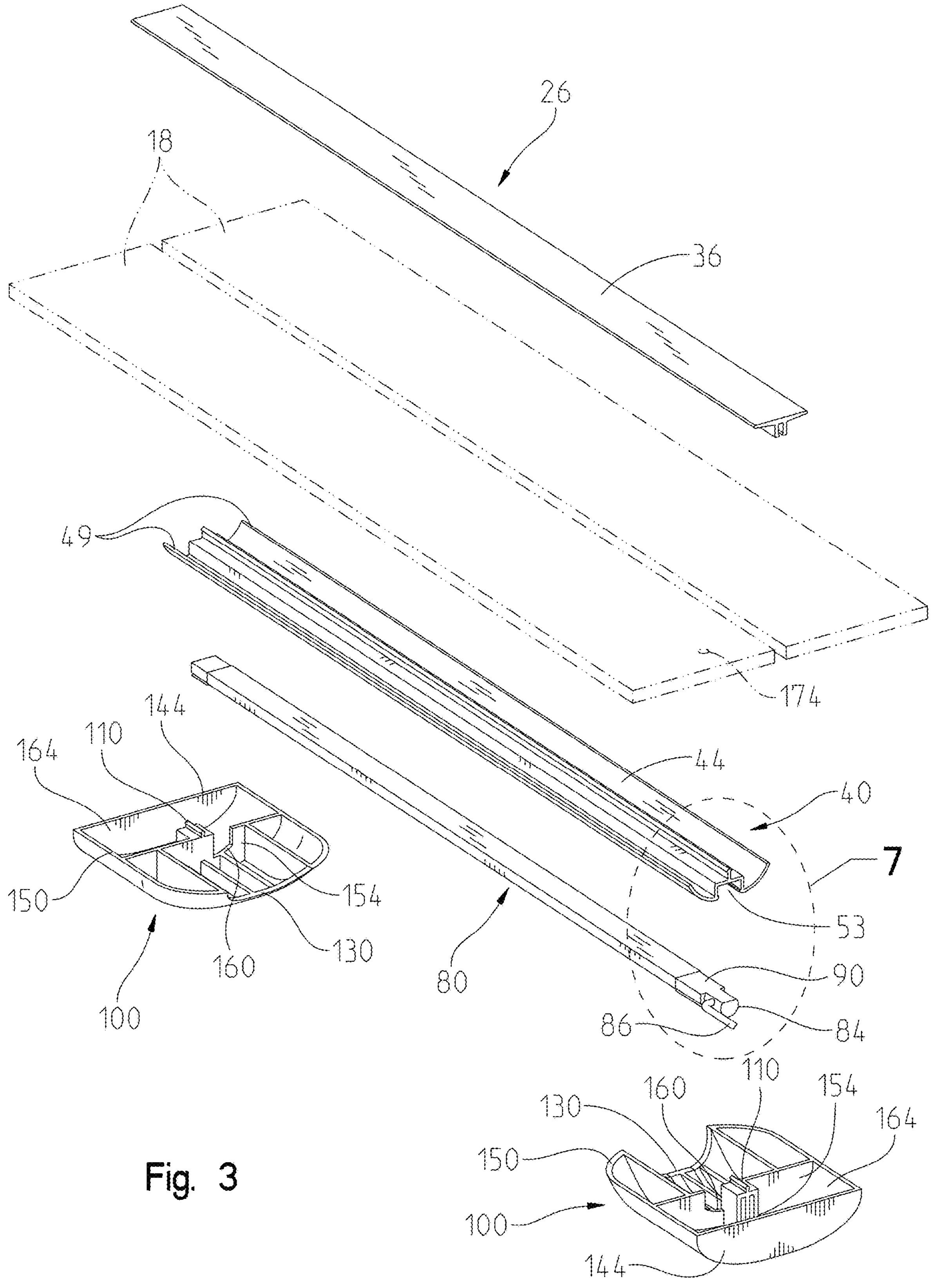
FIG. 3 is an exploded perspective view of the LED light strip holding system shown in FIGS. 1 and 2 showing the ceiling adjacent to the LED light strip holding system from above.
Figure 4:
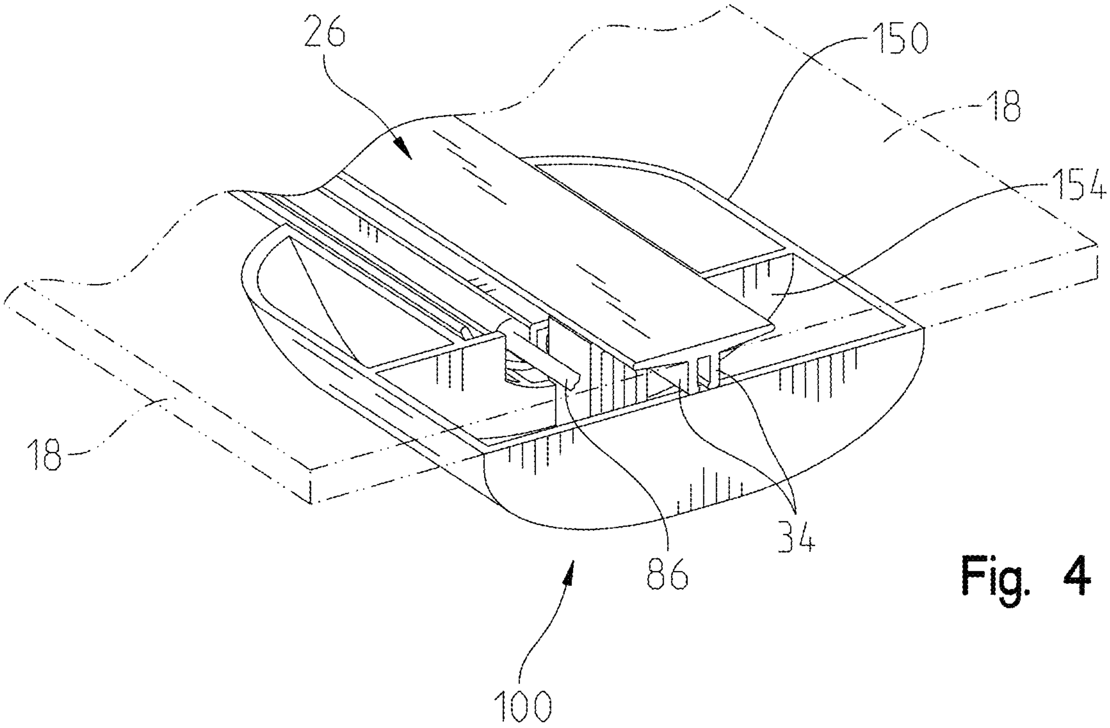
FIG. 4 is a magnified area of the LED light strip holding system shown in FIGS. 1-4 viewed from above the ceiling and showing how an end cap is assembled adjacent to the ceiling.
Figure 5:
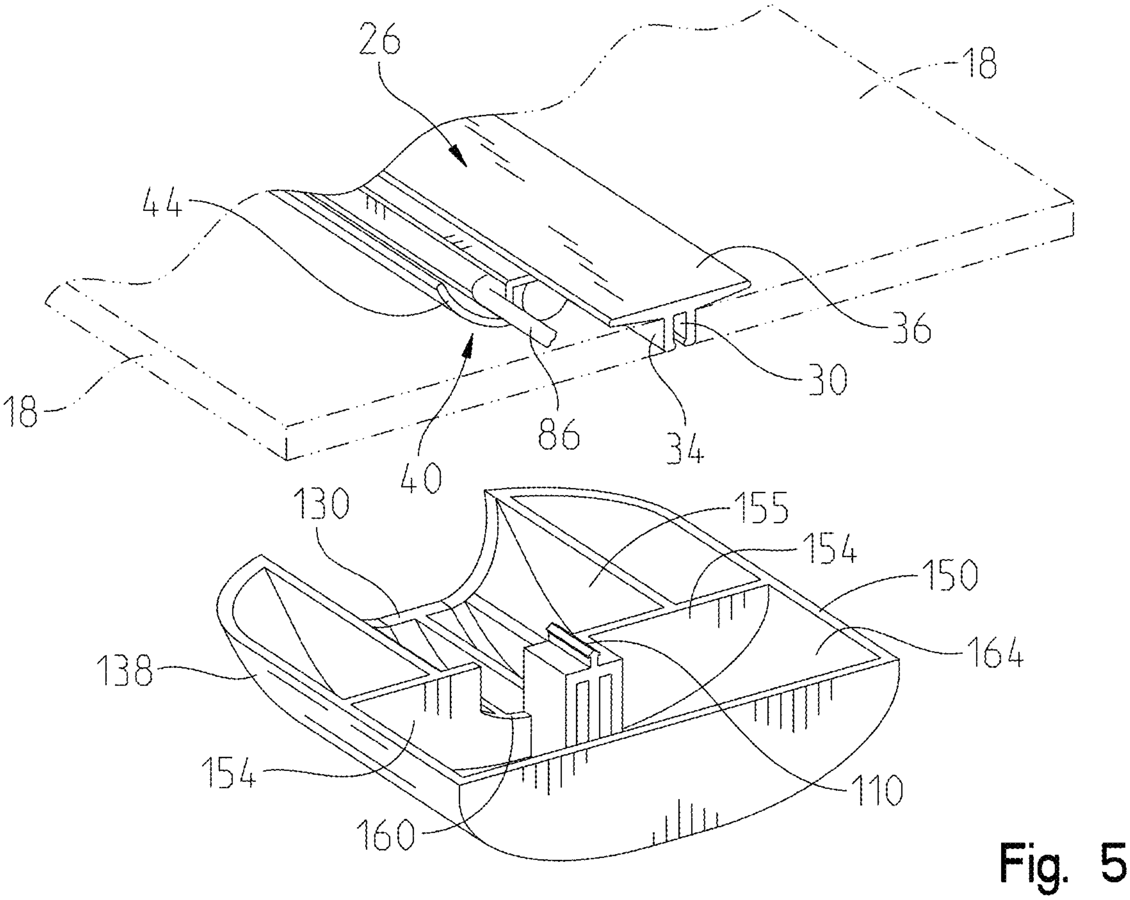
FIG. 5 is an exploded view of the area shown in FIG. 4.
Figure 6A:
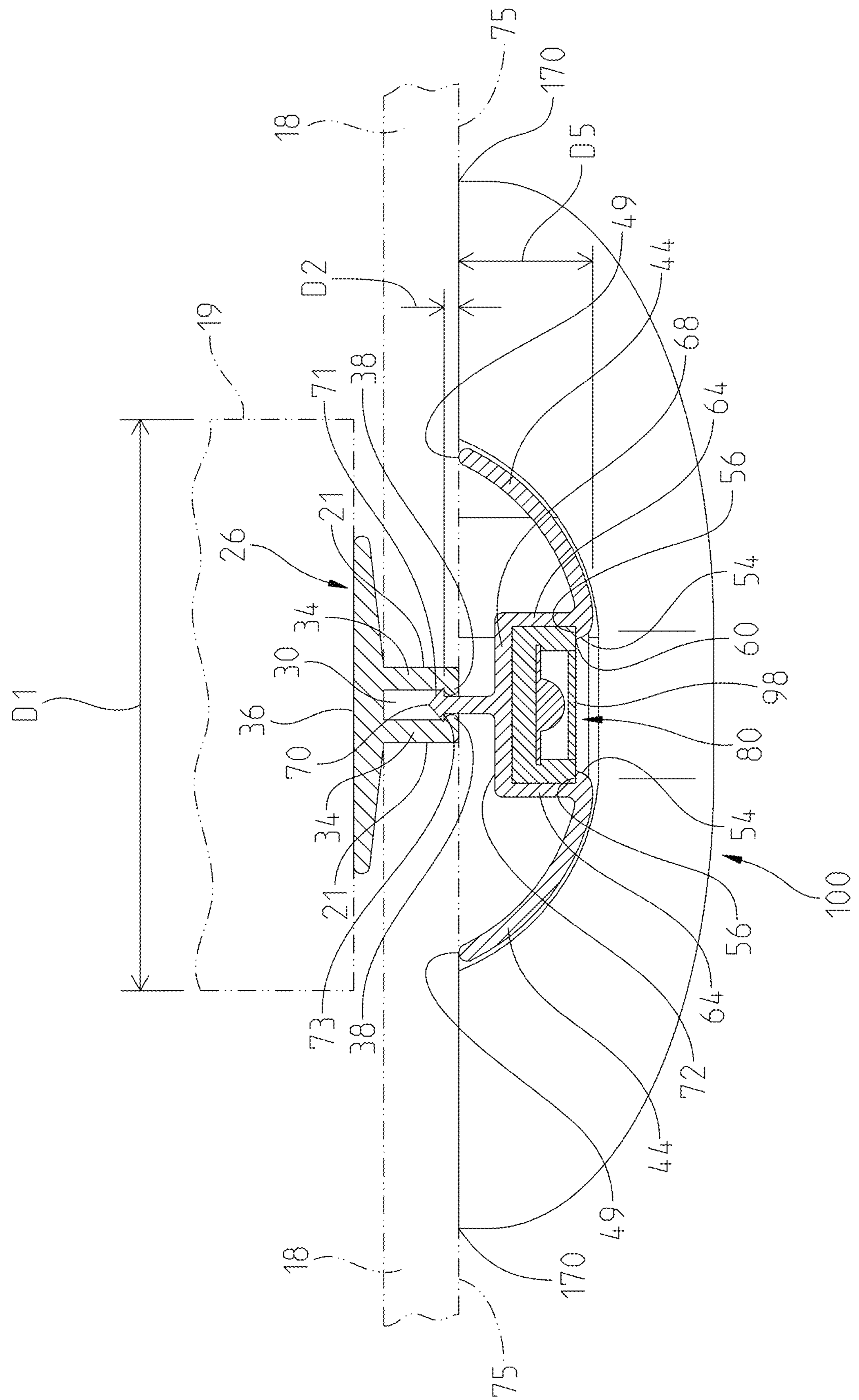
FIG. 6A shows a sectional view of the LED light strip holding system shown in FIGS. 1-5, taken about line 6A-6A in FIG. 1, with the elongate light holder retaining an LED light strip with the elongate light holder fully biased outward.

FIG. 1 shows an LED light holding system 10 of the present invention installed in a ceiling that is made in part from two adjacent ceiling boards 18 that make up an entire ceiling which is typical for installation in an RV. The term RV may mean a towable unit or a motorized unit. The ceiling boards 18 in an RV need not be made of wood as the term board implies but can be made of any material suitable to make an RV ceiling. In a typical installation of ceiling boards 18 that are used in an RV, the individual ceiling boards 18 are tacked onto the ceiling across joists 19 that form the bottom part of part of a roof truss 20. The joists 19 have a width D1 that defines their lower surface upon which the ceiling boards may be attached. The joists 19 form the attachment points and support for the many ceiling boards 18 that make up an entire RV ceiling. The fasteners holding the ceiling boards 18 may be nails, staples, screws, or any available fastener that will join the ceiling boards 18 to the joists 19 of the RV that supports the ceiling boards 18. The fasteners that hold the ceiling boards 18 also are driven into a retaining strip 26 that abuts lateral edges 21 of each ceiling board 18 as shown in FIG. 6A. The ceiling boards 18 straddle the retaining strip 26 and leave a groove 30 of the retaining strip 26 exposed. The groove 30 is formed from two upstanding walls 34 that extend from a base 36. Each upstanding wall 34 has a retention nub 38. The retention nubs 38 extend inwardly towards each other to narrow the groove 30 near the uppermost location of the groove 30 between the retention nubs 38 at a location opposite to the base 36. It is contemplated that the system 10 of the present invention could be used with other surfaces than ceilings (more broadly defined as walls) as long as a retaining strip 26 may be inserted between panels that function in the same manner as the ceiling boards 18. As such, the term panel is an appropriate general term for ceiling boards 18 because there is nothing about the present invention that requires its use for only ceilings, but the example provided herein will be primarily focused on the system 10 being used with ceiling boards 18. Therefore, the term ceiling boards 18 will be used instead of panels to convey the present invention.

Figure 7:
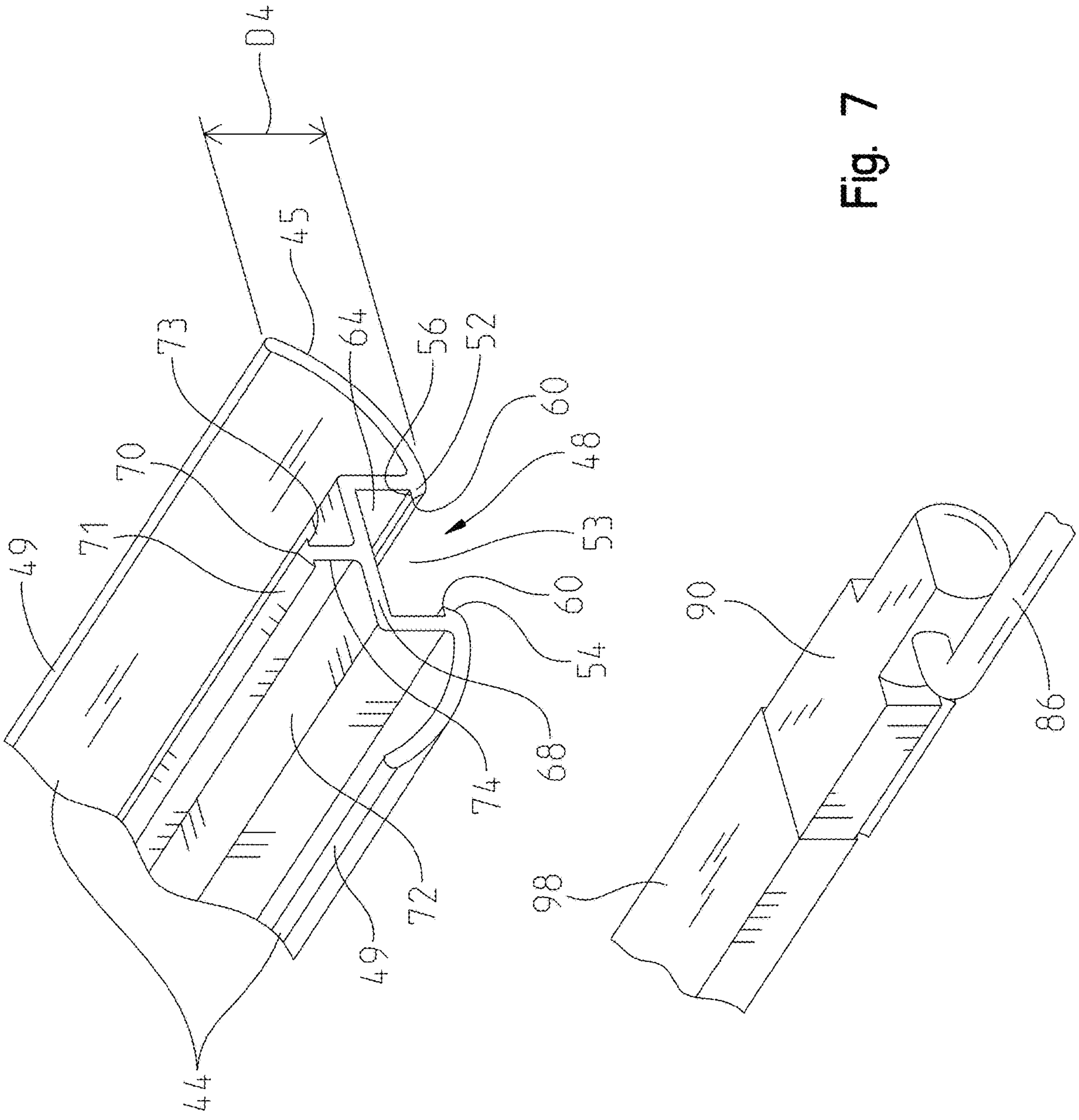
FIG. 7 shows area 7 in FIG. 3 magnified.
Figure 8:
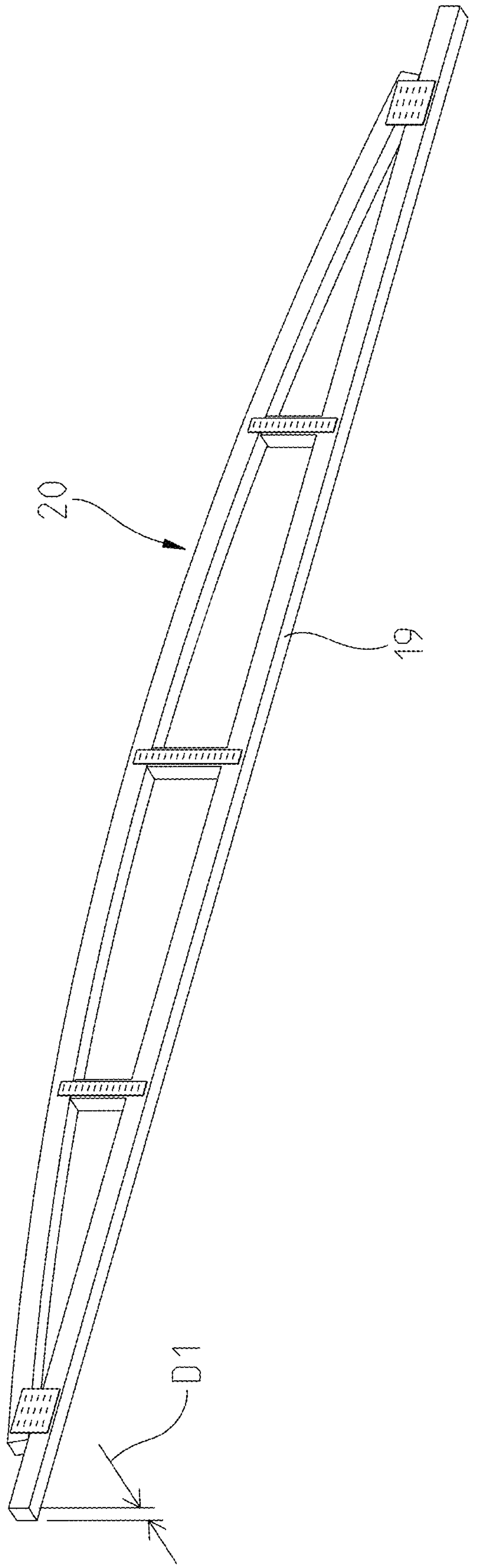
FIG. 8 shows a roof truss used in an RV.

An elongate light holder 40 is an extrusion that has lateral wings 44 that extend outwardly of a centrally located channel 48. The wings 44 extend outwardly of the elongate light holder 40 and terminate at tips 49 that are for contacting the ceiling boards 18. The wings 44 cooperate to form an outer contoured surface 45 that spans the width of the elongate light holder 40. The centrally located channel 48 includes overhanging walls 52 on either side of the opening 53 of the channel 48. The overhanging walls each have inclined surfaces 54 that face each other. The centrally located channel 48 extends well beneath the outer contoured surface 45. Adjacent to the overhanging walls 52 are catch surfaces 56. The catch surfaces 56 terminate at terminal edges 60 that is also the end of the inclined surfaces 54. The terminal edges 60 are the intersection of the inclined surfaces 54 and the catch surfaces 56. The catch surfaces 56 and terminal edges 60 are located inwardly of lateral walls 64 and thereby narrow the channel 48 between the terminal edges 60. The lateral walls 64 define the width of the channel 48. The lateral walls 64 of the channel 48 extend into a bottom wall 68 of the channel 48 beyond the terminal edges 60. The bottom wall 68 defines how far beneath the outer contoured surface 45 that the channel 48 extends. The catch surfaces 56 are substantially parallel to the bottom wall 68 of the channel 48. It is contemplated that the catch surfaces 56 could be slightly angled so that the terminal edges 60 are nearer the bottom wall 68 than the location where the catch surfaces 56 meet the lateral walls 64. This configuration would provide a biting action that may be useful for retaining objects within the channel 48. The elongate light holder 40 includes a retention barb 70. The retention barb 70 is connected to the bottom wall 68 by a ridge wall 74. The ridge wall 74 extends from the bottom wall 68 on the opposite side of the bottom wall 68 as the channel 48. The ridge wall 74 stands beyond and is spaced from the bottom surface 72 of the bottom wall 68. The elongate light holder 40 is an integral unitary assembly that is a single piece extrusion. Bending the tips 49 of the wings 44 toward the opening 53 of the channel 48 is considered the installed position. The uninstalled position is shown in FIG. 7 and corresponds to the free state of the elongate light holder 40. FIG. 6A is the installed position of the wings 44 and it shows the tips 49 nearer the opening 53 of the channel 48 than in the uninstalled position shown in FIG. 7. In the uninstalled position, the tips 49 of the wings 44 are at a first distance from the opening 53. When the wings 44 are in the installed position, the tips are at a second distance from the opening 53. That second distance corresponding to the wings 44 being in their installed position is nearer than the first distance with respect to the opening 53. Thus, the second distance corresponding to the installed position is smaller than the first distance corresponding to the uninstalled position. Bending the wings 44 to the installed position tends to bend the lateral walls 64 inwardly and bias them with a force toward each other as the wings 44 transmit force through the elongate light holder 40. When the wings 44 are in the installed position, the wings 44 are biased toward returning to the uninstalled position, which means the wings 44 are biased away from the opening 53. The uninstalled position of the wings 44 is the free state of the wings 44 when the elongate light holder 40 is not contacting another adjacent part such as the ceiling boards 18. It is contemplated that it may be possible to bend the tips 49 of the wings to be aligned with the opening 53 and this would correspond to second distance of the tips 49 mentioned above being zero. However, this level of extreme bending of the tips 49 to a zero distance offset from the opening 53 is not necessary to achieve a useful bias of the tips 49 toward the uninstalled position shown in FIG. 7. For clarity, the distance by which the tips 49 are from the opening 53 as measured when describing the installed and uninstalled positions is measured in a vertical direction aligned with the central axis of the ridge wall 74. The first distance D4 of the tips 49 corresponding to the uninstalled position is shown in FIG. 7. The second distance D5 from the opening 53 corresponding to the installed position is shown in FIG. 6A.

Figure 6B:
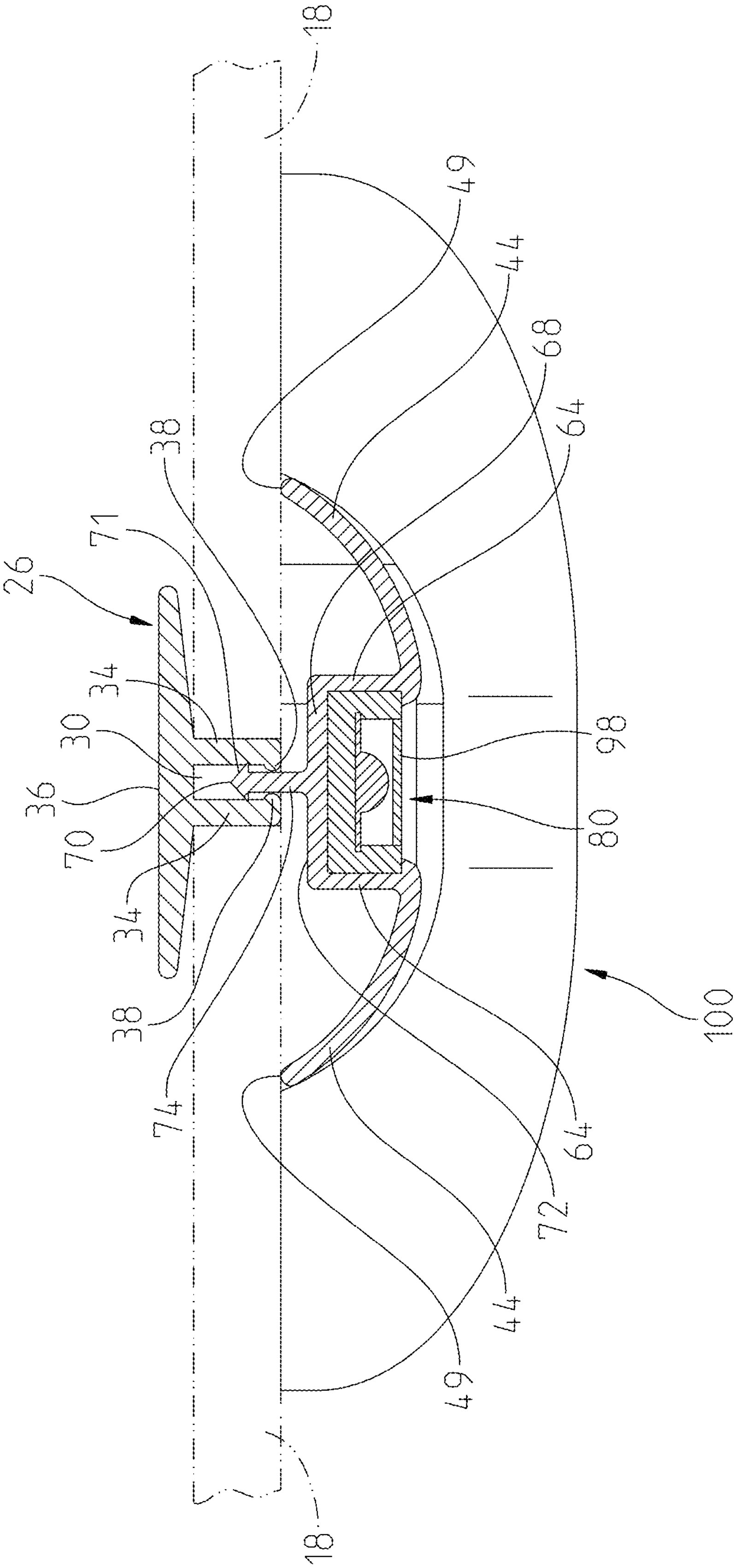
FIG. 6B shows a sectional view of the LED light strip holding system shown in FIGS. 1-6A, much like the view shown in FIG. 6A, with the elongate light holder retaining an LED light strip with the elongate light holder compressed from the fully biased outward position

The retention barb 70 is designed to be inserted between the nubs 38 of the retaining strip 26. The retention barb 70 has inclined surfaces 71 that provide for its easy insertion into the opposing nubs 38. Once the barb 70 is past the nubs 38, it catches at a location behind the nubs 38 on catch surfaces 73 that are opposite the inclined surfaces 71. This impingement of the catch surfaces 73 on the nubs 38 provides a one-way insertion that enables the elongate light holder 40 to be snapped into place within the retaining strip 26. This snap-fit provides a sliding connection that allows the retaining strip 26 to be adjusted axially along its length by moving it within the retaining strip 26. The distance from the catch surfaces 73 on the retention barb 70 with respect to the interior facing surface 75 of the ceiling boards 18 is a first distance D2. This corresponds to the installed position of the elongate light holder 40. The wings 44 provide a resilient bias against the interior facing surface 75 of the ceiling boards when the barb 70 is caught between the nubs 38 of the retaining strip 26. In this manner, the wings 44 act as springs. This resilient bias against the interior facing surface 75 of the ceiling boards 18 when the barb 70 is installed in the retaining strip 26 biases the retention barb 70 toward the nubs 38 and provides a tight fit to the ceiling boards 18. As such, when the wings 44 are in the installed position, the wings 44 are biased toward the retention barb 70, and the wings 44 are biased to seek their uninstalled position, but are prevented from doing so by their contact with the ceiling boards 18. That interaction drives the barb 70 toward the nubs and keeps the wings 44 in biased tension against the ceiling boards 18 when the elongate light holder is installed. As will be discussed below, the wings 44 may not bias the barb 70 completely against the nubs 38 in certain locations, and the spacing of the barb 70 from the nubs 38 may be controlled by end caps 100. In locations spaced from the end caps 100, it is contemplated that the retention barb 70 be biased against the nubs 38 and that the nubs 38 act as a limit on how far the wings 44 can pull the retention barb 70 out of the groove 30 (as shown in FIG. 6A). When the retention barb 70 is pulled tight against the nubs 38, the wings 44 are held tightly against the ceiling boards 18. The bottom surface 72 of the bottom wall 68 is spaced from the ceiling boards 18 in the installed position. The wings 44 have a first position that is an uninstalled position that is shown in FIG. 7, and the second position of the wings 44, which is the installed position, is shown in FIG. 6A. The installed position of the wings 44 is characterized by the wings 44 being resiliently being bent in a direction opposite of the retention barb 70. In other words, the installed position of the wings 44 is a position where the tips 49 are bent in a location further away from the retention barb 70 than shown in FIG. 7. The installed position of the wings 44 is characterized by the wings 44 being bent away from the retention barb 70 even in the event that the retention barb 70 does not fully contact the nubs 38 as shown in FIG. 6B. Movement of the wings 44 into their installed position means bending the wings 44 away from the retention barb 70 to a location further than their uninstalled state shown in FIG. 7. The installed position of the wings 44 spaces the wings 44 at a greater distance from the retention barb 70 than in the uninstalled state because the wings 44 are resiliently bent away from retention barb 70. It should be noted that the retention barb 70 need not have the exact shape as shown and it is contemplated that the retention barb 70 may be of a circular cross-sectional shape, which would also engage the retention nubs 38 in the same manner as the retention barb 70 as shown. In this case, the catch surfaces 73 would be replaced with round surfaces on a circular retention barb 70. The main requirement for the retention barb 70 is that the retention barb 70 be wider than the ridge wall 74 to which it is connected.

The elongate light holder 40 is designed to hold an LED light 80. The LED light 80 is a strip that has a power connector 84 and a cord 86 that extends from the power connector 84. The cord 86 is shown as a single element, but in practice contains the two wires that are wrapped together that are required to make the electrical connection that powers the LED light strip 80. As the wings 44 are pushed into their installed position (shown in FIG. 6A), this tends to flex the lateral walls 64 of the channel 48 tightly against the LED light 80. Because the elongate light holder 40 is resilient and the wings 44 are resiliently bent in the installed position, the flex of the lateral walls 64 tightens the lateral walls 64 against the LED light strip 80. This inward bias of the lateral walls 64 toward the LED light strip 80 produces a biasing force within the channel 48 that enhances the grip of the elongate light holder 40 on the LED light 80 and prevents it from rattling within the channel 48. The affirmative grip provided by the biasing force produces a clean appearance with no gaps along the sides of the LED light strip 80 within the channel 48. That affirmative grip and biasing force also enables the elongate light holder 40 to hold on to the LED light 80 without the use of adhesive. A lens 98 of the LED light strip 80 is located in an unobstructed position so that it may shine brightly out of the channel 48. The complementary fit of the terminal edges 60 and the catch surfaces 56 against the LED light strip 80 serve as a retention mechanism to hold the LED light strip 80 into the channel 48.

The LED light holding system 10 of the present invention uses end caps 100 in conjunction with the elongate light holder 40. Each end cap 100 has a retention barb 110 that is on a ridge wall 109, and the retention barb 110 designed to be captured within the groove 30 of the retaining strip 26. The retention barb 110 on the end caps 100 functions like the retention barb 70 on the elongate light holder 40. At least a portion of the retention barb 110 is wider than the ridge wall 109 to which it is connected so that it may engage the nubs 38. The end caps 100 have a coped portion 130 of an outer shell 138 that is curved to meet in a complementary fit with the elongate light holder 40 when it is inserted into the end caps 100. The outer shell 138 has a rounded appearance near the side that faces elongate light holder 40. Opposite the coped portion 130 there is an end wall 144 that is substantially perpendicular to bottom edges 150 of the end cap 100 that are for resting on the interior facing surface 75 of the ceiling boards 18 that the end cap 100 covers. The bottom edges 150 cooperatively align to form a planar surface for resting upon the interior facing surfaces 75 of the ceiling boards 18. The retention barb 110 on the end caps 100, in some cases, may not extend into the retaining strip 26 as far as the retention barb 70 on the elongate light holder 40. The amount that the retention barb 110 extends beyond the bottom edges 150 is determined by the application in which the end caps 100 are to be used. The amount that the retention barb 110 extends beyond the bottom edges 150 is chosen so that catch surfaces 111 on the retention barb 110 engage the nubs 38 of the retaining strip 26 at a depth that aligns the bottom edges 150 with the interior facing surfaces 75 of the ceiling boards 18 when the end cap 100 is installed into the retaining strip 26. Typically, the distance the catch surfaces 111 extend beyond the bottom edges 150 (indicated by D3) is less than D2. D2 pertains to how far the retention barb 70 extends beyond the wings 44 when the elongate light holder 40 is in its installed position. D3 is set based on the thickness of the ceiling boards 18. It is also contemplated that D2 may be equal to D3; in which case, the installed position of the elongate light holder 40 would be exactly aligned with the coped portion 130 when the retention barb 70 of the elongate light holder 40 contacts the nubs 38, and the wings 44 would provide only a slight bias against the coped portion 130 through the flexing of the wings 44, as described above. Thinner ceiling boards require a smaller D3 than the thicker ceiling boards 18 to facilitate tight alignment of the bottom edges 150 with the interior facing surface 75 of the ceiling boards 18. Because D3 is typically less than D2, this allows the wings 44 to bias the elongate light holder 40 tight against the coped portion 130 of the end caps 100. In this case when D3 is less than D2, the end caps 100 will push the retention barb 70 slightly down into the groove 30 so that the retention barb 70 of the elongate light holder 40 is pushed inward of the nubs 38 at locations near the coped portion 130. This condition is shown in FIG. 6B. In the case where D3 is less than D2, this will provide a very tight bias of the elongate light holder 40 against the coped portion 130 and at locations spaced from where the end caps 100 are pressed against the elongate light holder 40. The resilient structure of the elongate light holder 40 will allow enough flexibility of the barb 70 to engage the nubs 38 at locations spaced from the end caps 100 so that the contact of the barb 70 on the nubs 38 looks like FIG. 6A.

The elongate light holder 40 may be inserted to a range of depths within the coped portion 130 and is only limited to its depth of insertion within the coped portion 130 by a bulkhead wall 154 that terminates at the same level as the bottom edges 150. It is contemplated that a bulkhead wall 154 be omitted, or that the bulkhead wall 154 be of a similar height as the coped portion 130. The coped portion 130 that is part of the shell 138 and the bulkhead wall 154 define a light holder pocket 155 that is located between the coped portion 130 and the bulkhead wall 154. Shifting the elongate light holder 40 longitudinally is possible because the bulkhead wall 154 is spaced from the coped portion 130. Shifting the elongate light holder 40 may also be possible in the event that the coped portion 130 and bulkhead wall 154 have the same shape and are in alignment, as the elongate light holder 40 may extend beyond the bulkhead wall 154 if it is at the same level as the coped portion 130. As such, the light holder pocket 155 can accommodate a wide range of lengths that it may cover the elongate light holder 40. This is particularly useful because the cut length of the elongate light holder 40 may not be consistent and the end cap 100 can accommodate varying lengths of elongate light holders. The spacing of D2 and D3 allow the elongate light holder 40 to press against the coped portion 130 tightly so that no light gap can be seen between the elongate light holder 40 and the end cap 100. This tight fit and bias of the wings 44 press the catch surfaces 111 against the nubs 38 with enough force that the end cap 100 does not move unless it is deliberately shifted within the groove 30. This sliding fit of the retention barb 110 in the groove 30 is useful for slight adjustments of positioning of the end cap 100. As a further prevention of light leakage from the end cap 100 when the elongate light holder 40 and LED light 80 are retained within the light holder pocket 155, the portion of the outer shell 138 is between the coped portion 130 and the bulkhead wall 154 is more opaque than the rest of the outer shell 138. In other words, the portion of the outer shell 138 that defines the light holder pocket 155 is more opaque than the rest of the outer shell 138. In the case that there is no bulkhead wall 154 or the height of the bulkhead wall 154 is the same as that of the coped portion 130, the outer shell 138 is made more opaque from the coped portion 130 to the end wall 144 so that no matter how far the elongate light holder is inserted into the end cap 100, no light will show through the outer shell 138. This greater opacity can be accomplished by either using more opacifiers in the end cap 100 in the portion of the outer shell 138 between the coped portion 130 and the bulkhead wall 154, which can be accomplished by thickening this portion relative to the thickness of the end cap 100 elsewhere, or by using more opacifiers in the plastic forming the outer shell 138.

Figure 6C:
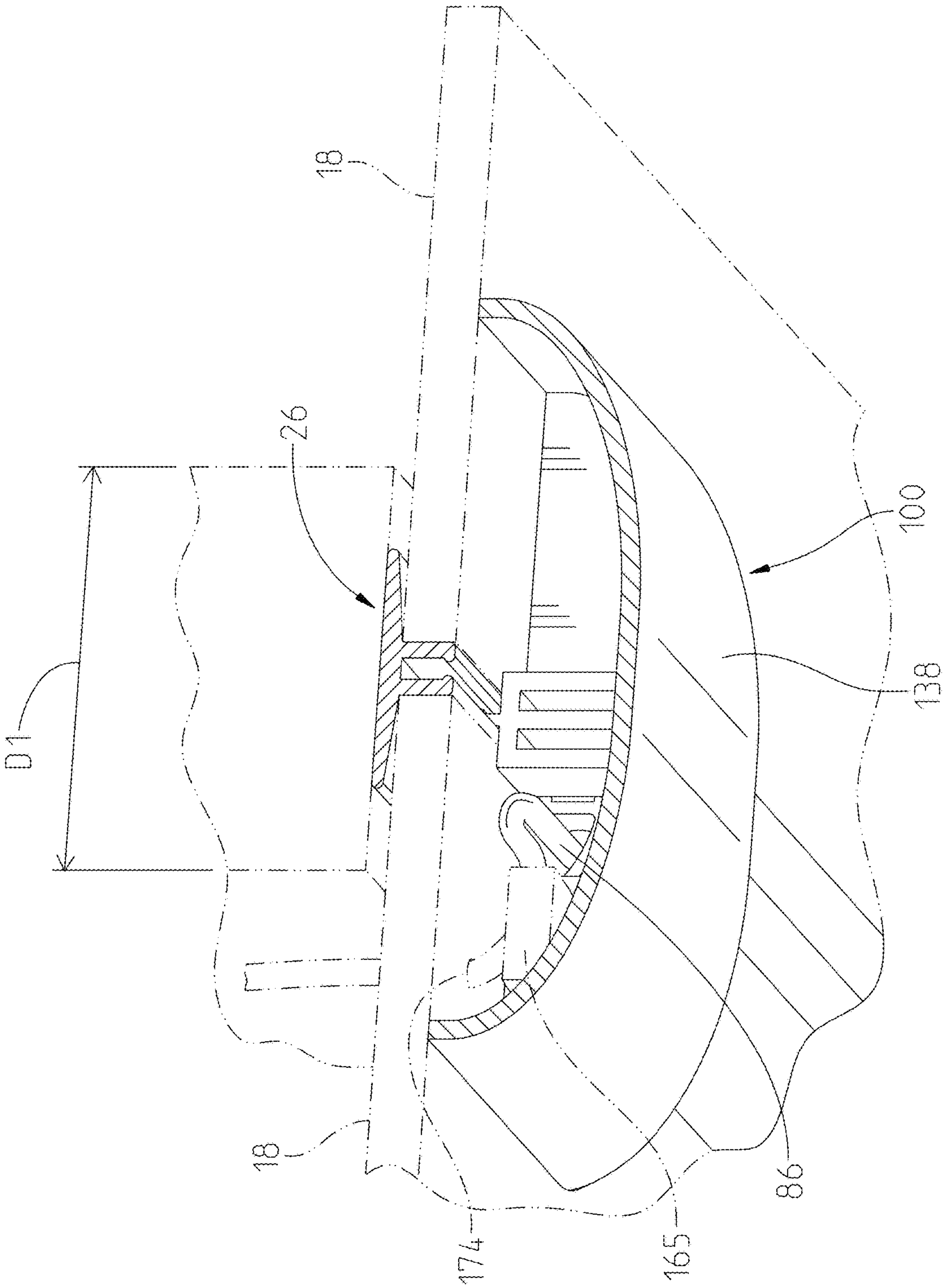
FIG. 6C shows a sectional view of the LED light strip holding system shown in FIGS. 1-5, taken about line 6C-6C in FIG. 1.
Figure 6D:
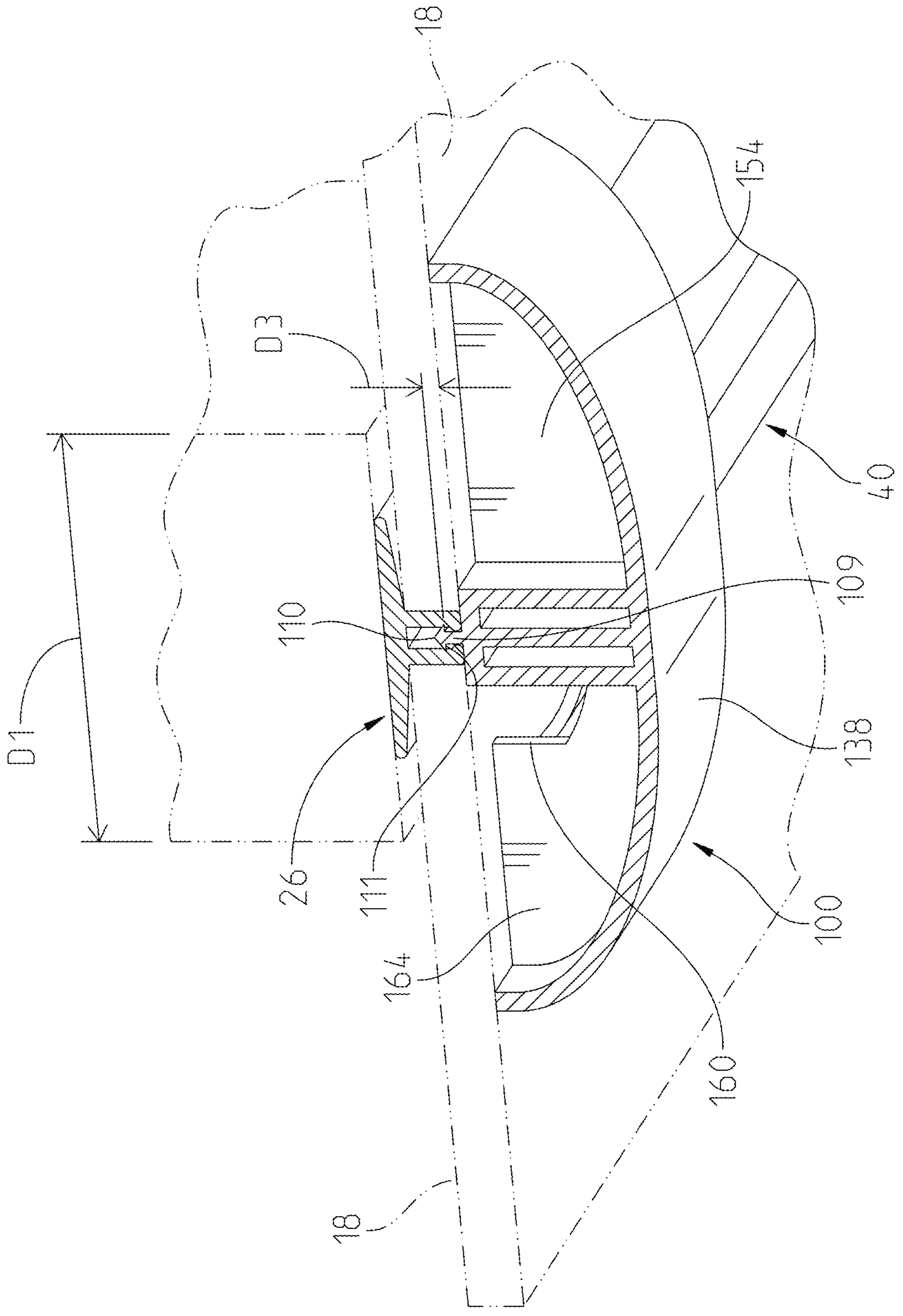
FIG. 6D is a sectional taken about the line 6D-6D in FIG. 1 that is through an end cap installed.

The bulkhead wall 154 has a wire notch 160 into which the cord 86 may be inserted. The cord 86 may be placed in a connection chamber 164 that is bounded by the outer shell 138, the bulkhead wall 154, and the end wall 144. The connection chamber 164 is opposite the light holder pocket 155. The connection chamber 164 is for making connections with the wires in the cord 84. The connection chamber 164 has enough room for wire nuts, crimp on connectors, Wago®, or other wire splicing devices. An electrical connection device 165 is shown in FIG. 6C. It is contemplated that the connection chamber 164 not be bounded by a bulkhead wall 154 so that the connection chamber 164 may at times receive a portion of the elongate light holder 40. The bulkhead wall 154 prevents the elongate light holder 40 from extending into the connection chamber 164, however, that is not necessary. In the case that there is no bulkhead wall, 154 users must ensure that the elongate light holder 40 does not extend into the connection chamber 164 so far that there is no room for electrical connections within the connection chamber 164.

The end cap 100 has lateral edges 170 that define the width of the end cap 100 where it contacts the interior facing surface 75 of the ceiling boards 18 that it contacts when it is installed. Consequently, the outer shell 138 defines a connection chamber 164 that is wider than D1 of the joist 19 about which the end cap 100 is centered about when it is installed into the retaining strip 26. This connection chamber 164 being than the width of the joist 19 defined by D1 provides lateral coverage outside of the width of the joist 19 on the ceiling boards 18 onto which the end cap 100 is held. Thus, the connection chamber 164 is wider opposite of the location of the joist 19 behind the ceiling boards 18. This allows the end cap 100 to obscure portions of the interior facing surface 75 of the ceiling boards 18 outside of the width of the joist 19. Due to the connection chamber 164 being wider, than the joist 19 holes 174 can be drilled into the ceiling boards 18 outside of the width of the joist 19. This allows wires in the cord 84 to be connected to wires in the RV without having to drill into the joist 19 or compromise it in any way. The location of holes 174 outside of the width of the joist 19 also allows faster and easier drilling because the only drilling required to create holes 174 is through the relatively thin ceiling boards 18 rather than through the thickness of the joist 19. Further, not drilling through the thickness of the joist 19 will not damage its structural integrity.

Figure 9:
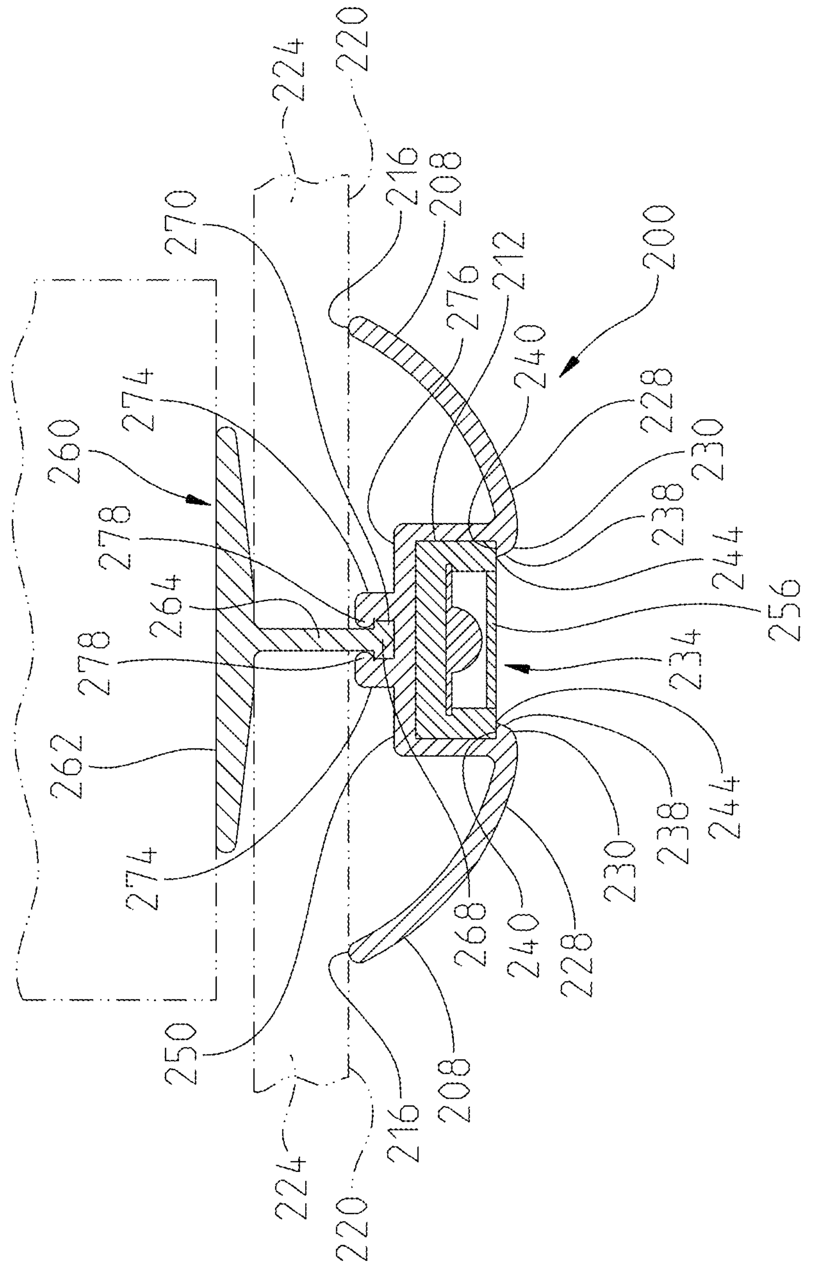
FIG. 9 is a sectional view of an LED light holding system having a retention barb and ridge wall on a retaining strip and a groove on the elongate light holder showing the elongate light holder in the installed position.
Figure 10:
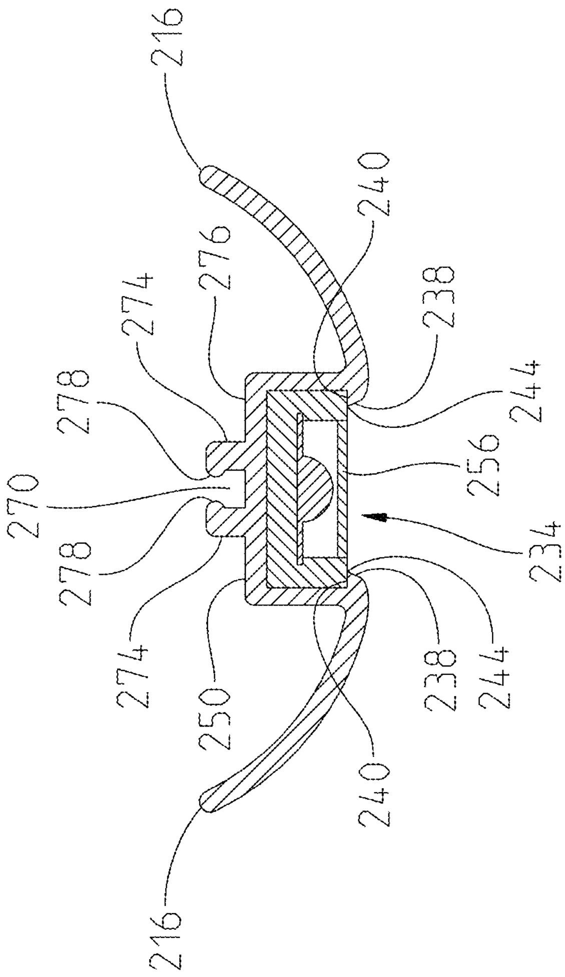
FIG. 10 is a sectional view of the elongate light holder shown in FIG. 9 in its uninstalled position.

FIG. 9 shows an elongate light holder 200 that is an extrusion that has lateral wings 208 that extend outwardly of a centrally located channel 212. The wings 208 extend outwardly of the elongate light holder 200 and terminate at tips 216 that are for contacting a surface 220 that the elongate light holder 200 is mounted adjacent to. In this case, the surface 220 is made of individual panels 224. The wings 208 cooperate to form an outer contoured surface 228 that spans the width of the elongate light holder 200. The centrally located channel 212 includes overhanging walls 230 on either side of the opening 234 of the channel 212. The overhanging walls 230 each have inclined surfaces 238 that face each other. The centrally located channel 212 extends well beneath the outer contoured surface 228. Adjacent to the overhanging walls 230 are catch surfaces 240. The catch surfaces 240 terminate at terminal edges 244 that also are the end of the inclined surfaces 238. The terminal edges 244 are the intersection of the inclined surfaces 238 and the catch surfaces 240. Lateral walls 246 define the width of the channel 212. The lateral walls of the channel 212 extend into a bottom wall 250 of the channel 212 that is spaced from the terminal edges 244. The bottom wall 250 defines how far beneath the outer contoured surface 228 the channel 212 extends. The catch surfaces 240 are substantially parallel to the bottom wall 250 of the channel 212. It is contemplated that the catch surfaces 240 could be slightly angled so that the terminal edges 244 are closer to the bottom wall 250 than the catch surfaces 240. This may provide some biting action for holding a light strip 256 within the channel 212. The elongate light holder 200 is designed to mate with a retaining strip 260. The retaining strip 260 has a base 262 and a ridge wall 264 that extends from the base 262. The ridge wall 264 has a retention barb 268 thereon and the retention barb 268 is wider than the ridge wall 264. The retention barb 268 has the same features thereon as retention barb 70 described above. The retention barb 268 is designed to mate with a groove 270 on the elongate light holder 200. The groove 270 is defined by upstanding walls 274 that extend from a bottom surface 276 of bottom wall 250. Each of the upstanding walls 274 has a retention nub 278. The retention nubs 278 face each other within the groove 270 and narrow the groove 270. As can be seen in FIG. 9, the retention nubs 278 are nearer to each other than the widest part of the retention barb 268 and therefore, capture the retention barb 268 in the groove 270 when the retention barb 268 impinges on the retention nubs 278.

Figure 11:
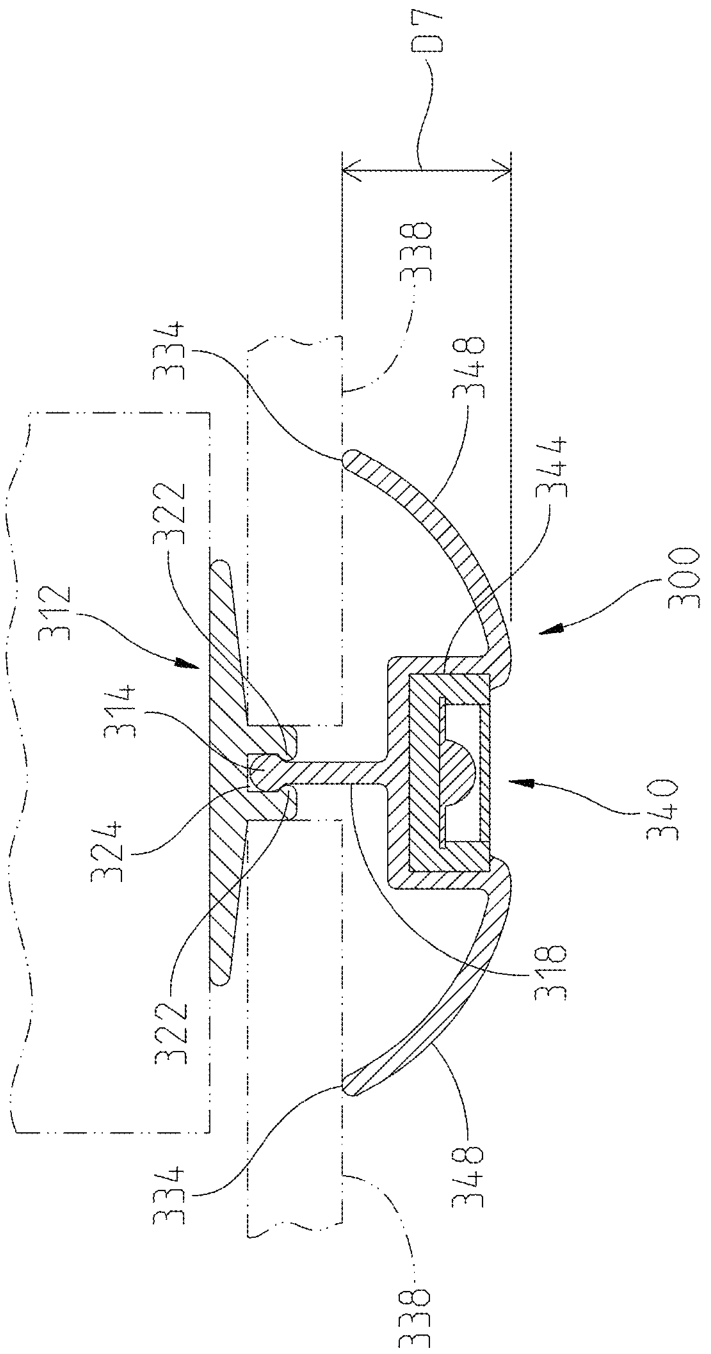
FIG. 11 is a sectional view of an LED light holding system with a round retention barb and ridge wall extending from the elongate light holder and a retaining strip with a groove.
Figure 12:
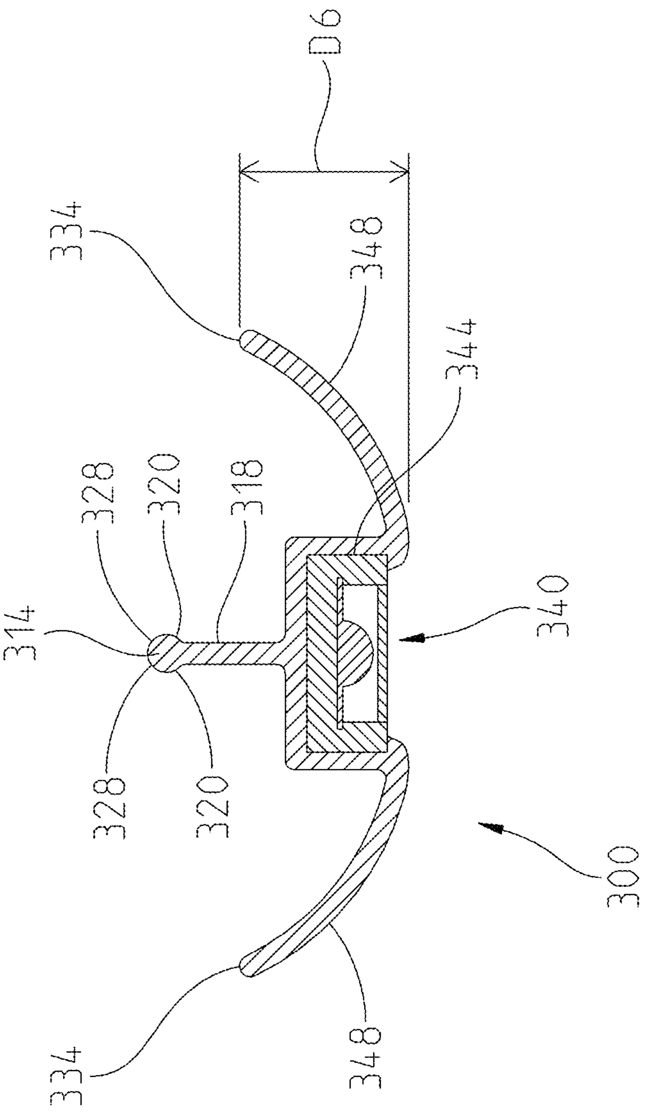
FIG. 12 is a sectional view of the elongate light holder shown in FIG. 11 in its uninstalled position.

FIG. 11 shows an elongate light holder 300 that is used with a retaining strip 312. In this case the retention barb 314 has a circular cross section and is attached to a ridge wall 318 that extends from the elongate light holder 300. The circular cross-sectional portion that forms the retention barb 314 is wider than the ridge wall 318. In the case of retention barb 314, it has catch surfaces 320 that engage retention nubs 322 within a groove 324 of the retaining strip 312. The opposite side of the retention barb 314 functions as inclined surfaces 328 that facilitate pushing the retention barb 314 smoothly past the retention nubs 322 until catch surfaces 320 may engage the retention nubs 322. The engagement of the catch surfaces 320 with the retention nubs 322 maintains the tips 334 of the elongate light holder 300 in biased engagement with surface 338 to which the elongate light holder 300 is mounted adjacently thereto. The tips 334 of wings 348 have a first distance D6 that corresponds to an uninstalled distance from the tips 334 of the wings 348 from an opening 340 of channel 344 as shown in FIG. 12. As noted above, D6 is measured vertically in the same direction as the ridge wall 318. The tips 334 of the wings 348 have a second distance D7 from opening 340, as shown in FIG. 11, that corresponds to an installed distance from the opening. D7 is also measured vertically in the same direction as the ridge wall 318. The second distance D7 is less than the first distance D6. When the elongate light holder 300 and the tips 334 of the wings 348 are in their installed position, the tips 334 are biased away from the opening 340.

The invention is not limited to the details disclosed above but may be modified within the scope of the following claims.

What is claimed is:

1. A light holding system comprising:

a retaining strip an elongate light holder having wings defining an outer contoured surface and said wings having tips, a channel extending beneath said outer contoured surface, said channel including overhanging walls adjacent to said outer contoured surface, said channel having lateral walls and said lateral walls joined to a bottom wall, said channel including an opening adjacent to said outer contoured surface, said bottom wall having a bottom surface opposite said channel, one of said bottom surface and said retaining strip having a ridge wall including a retention barb and the other of said bottom surface and said retaining strip having a groove including upstanding walls defining said groove and said groove including retention nubs within said groove, said wings being resiliently bendable between an uninstalled position and an installed position, said uninstalled position locating said tips of said wings at a first distance from said opening and said installed position locating said tips of said wings at a second distance from said opening and said second distance being nearer than said first distance with respect to said opening, when said wings are in said installed position said wings being biased away from said opening and toward said uninstalled position.

2. The light holding system of claim 1, wherein said retention barb includes inclined surfaces and catch surfaces facing said ridge wall.

3. The light holding system of claim 2, wherein said overhanging walls include inclined surfaces facing said outer contoured surface and adjacent to said outer contoured surface, and said overhanging walls having catch surfaces facing said bottom wall of said channel.

4. The light holding system of claim 3, wherein said inclined surfaces and said catch surfaces meet at terminal edges, said terminal edges being nearer to each other than said lateral walls.

5. The light holding system of claim 1, wherein a portion of said retention barb is wider than said ridge wall.

6. The light holding system of claim 5, wherein said portion of said retention barb that is wider than said ridge wall and is wider than a distance between said retention nubs within said groove.

7. The light holding system of claim 1, wherein said channel is capable of receiving an LED light strip and when said wings are in said installed position, said lateral walls of said channel being biased against said LED light strip received within said channel when said wings are in said installed position.

8. A light holding system comprising:

a retaining strip an elongate light holder having wings defining an outer contoured surface and said wings having tips, a channel extending beneath said outer contoured surface, said channel including overhanging walls adjacent to said outer contoured surface, said channel having lateral walls defining an internal width of said channel, said overhanging walls extending toward each other and being narrower than internal width of said channel, said lateral walls joined to a bottom wall, said channel including an opening adjacent to said outer contoured surface, said bottom wall having a bottom surface opposite said channel one of said elongate light holder and said retaining strip having a ridge wall including a retention barb and the other one of said elongate light holder and said retaining strip having a groove including upstanding walls defining said groove and said groove including retention nubs with said groove, a portion of said retention barb being wider than said ridge wall, said wings being resiliently bendable between an uninstalled position and an installed position, said uninstalled position locating said tips of said wings at a first distance from said opening and said installed position locating said tips of said wings at a second distance from said opening and said second distance being nearer than said first distance with respect to said opening, when said wings are in said installed position said wings being biased away from said opening and toward said uninstalled position.

9. The light holding system of claim 8, wherein said retention barb includes inclined surfaces and catch surfaces facing said ridge wall.

10. The light holding system of claim 9, wherein said overhanging walls include inclined surfaces facing said outer contoured surface and adjacent to said outer contoured surface, and said overhanging walls having catch surfaces facing said bottom wall of said channel.

11. The light holding system of claim 10, wherein said inclined surfaces and said catch surfaces meet at terminal edges, said terminal edges being nearer to each other than said lateral walls.

12. The light holding system of claim 8, wherein said portion of said retention barb that is wider than said ridge wall and is wider than a distance between said retention nubs within said groove.

13. The light holding system of claim 8, wherein said channel is capable of receiving an LED light strip and when said wings are in said installed position, said lateral walls of said chancel being biased against said LED light strip received within said channel when said wings are in said installed position.

14. A light holding system comprising:

a retaining strip an elongate light holder having wings defining an outer contoured surface and said wings having tips, a channel extending beneath said outer contoured surface and said channel having lateral walls defining an internal width of said channel, said lateral walls joined to a bottom wall, said channel including an opening adjacent to said outer contoured surface, said bottom wall having a bottom surface opposite said channel, one of said bottom surface and said retaining strip having a ridge wall including a retention barb and the other one of said bottom surface, and said retaining strip having a groove including upstanding walls defining said groove and said groove including retention nubs with said groove, a portion of said retention barb being wider than said ridge wall, said wings being resiliently bendable between an uninstalled position and an installed position, said uninstalled position locating said tips of said wings at a first distance from said opening and said installed position locating said tips of said wings at a second distance from said opening and said second distance being nearer than said first distance with respect to said opening, when said wings are in said installed position said wings being biased away from said opening and toward said uninstalled position.

15. The light holding system of claim 14, wherein said channel includes overhanging walls spaced from said bottom wall and said overhanging walls being nearer to each other than said lateral walls and a distance between said overhanging walls being narrower than said internal width of said channel.

16. The light holding system of claim 15, wherein said overhanging walls include inclined surfaces facing said outer contoured surface, and said overhanging walls having catch surfaces facing said bottom wall of said channel.

17. The light holding system of claim 16, wherein said channel is capable of receiving an LED light strip and when said wings are in said installed position, said lateral wall of said channel being biased against said LED light strip received within said channel when said wings are in said installed position.

18. The light holding system of claim 14, wherein said portion of said retention barb that is wider than said ridge wall and is wider than a distance between said retention nubs within said groove.

* * * * *